(12) United States Patent
Yao (10) Patent No.: US 11,486,062 B2
(45) Date of Patent: Nov. 1, 2022

(54) HIGH-BRIGHTNESS LUMINESCENT YARN AND MANUFACTURING METHOD THEREOF

(71) Applicant: CHANCE LINE INDUSTRIAL CO., LTD., Siansi Township (TW)

(72) Inventor: Ming-Hsien Yao, Siansi Township (TW)

(73) Assignee: CHANCE LINE INDUSTRIAL CO., LTD., Siansi Township (TW)

( * ) Notice: Subject to any disclaimer, the term of this patent is extended or adjusted under 35 U.S.C. 154(b) by 0 days.

(21) Appl. No.: 16/862,241

(22) Filed: Apr. 29, 2020

(65) Prior Publication Data

US 2020/0347524 A1    Nov. 5, 2020

(30) Foreign Application Priority Data

May 3, 2019 (TW) .................................. 108115368

(51) Int. Cl.
| | |
|---|---|
| *D02G 3/06* | (2006.01) |
| *D02G 3/02* | (2006.01) |
| *D02G 3/36* | (2006.01) |

(52) U.S. Cl.
CPC ................. *D02G 3/06* (2013.01); *D02G 3/02* (2013.01); *D02G 3/36* (2013.01)

(58) Field of Classification Search
CPC ............... D02G 3/02; D02G 3/06; D02G 3/36
See application file for complete search history.

(56) References Cited

U.S. PATENT DOCUMENTS

| | | | | |
|---|---|---|---|---|
| 2,382,355 | A * | 8/1945 | Warren, Jr. | H01B 7/28 250/462.1 |
| 2,714,569 | A * | 8/1955 | Prindle | D01D 5/426 428/381 |
| 3,291,668 | A * | 12/1966 | Goldstein | B32B 27/00 156/67 |
| 3,376,453 | A * | 4/1968 | Leach | H05B 33/26 313/509 |
| 4,336,092 | A * | 6/1982 | Wasserman | D01D 5/42 156/269 |
| 4,546,042 | A * | 10/1985 | Quon | B32B 27/20 428/378 |
| 4,781,647 | A * | 11/1988 | Doane, Jr. | A63H 3/44 132/53 |
| 7,128,848 | B2 * | 10/2006 | Pourdeyhimi | D02G 3/346 252/301.36 |

(Continued)

*Primary Examiner* — Shaun R Hurley
(74) *Attorney, Agent, or Firm* — Guice Patents PLLC (57) ABSTRACT

A luminescent yarn and a manufacturing method thereof. The luminescent yarn is a multilayered structure, a cross-section of the yarn includes a main body and at least one luminescent surface layer having multiple luminescent particles and positioned on at least one surface of the main body. Accordingly, the luminescent surface layer is positioned on the surface of the luminescent yarn to directly absorb energy and emit luminescence, whereby the luminescent yarn has better luminance and longer luminescence-emitting time. The manufacturing method of the luminescent yarn includes steps of: manufacturing a film material, the film material having a substrate material and at least one luminescent layer disposed on at least one surface of the substrate material; and cutting the film material to form the luminescent yarn.

13 Claims, 8 Drawing Sheets

(56) References Cited

U.S. PATENT DOCUMENTS

| | | | | |
|---|---|---|---|---|
| 7,247,375 B2* | 7/2007 | Song | ............... | C09K 11/06 |
| | | | | 428/328 |
| 7,338,877 B1* | 3/2008 | Meyer | ............... | D01D 5/34 |
| | | | | 428/373 |
| 2005/0142371 A1* | 6/2005 | Swain | ............... | C09K 11/02 |
| | | | | 428/516 |
| 2016/0194823 A1* | 7/2016 | Nakagawa | ............... | D06P 3/60 |
| | | | | 428/375 |
| 2019/0033742 A1* | 1/2019 | Cohen | ............... | G03G 9/131 |

* cited by examiner

HIGH-BRIGHTNESS LUMINESCENT YARN AND MANUFACTURING METHOD THEREOF

BACKGROUND OF THE INVENTION

1. Field of the Invention

The present invention relates generally to a luminescent article, and more particularly to a luminescent yarn and a manufacturing method thereof.

2. Description of the Related Art

A luminescent yarn can emit luminescence at night. After the luminescent powders of the yarn absorb light, the luminescent powders will emit light in a dark place. The luminescent yarns can be woven into a fabric to manufacture a clothes. The clothes made of the luminescent yarns can emit luminescence at night to enhance the safety in activity at night.

Figure 16:
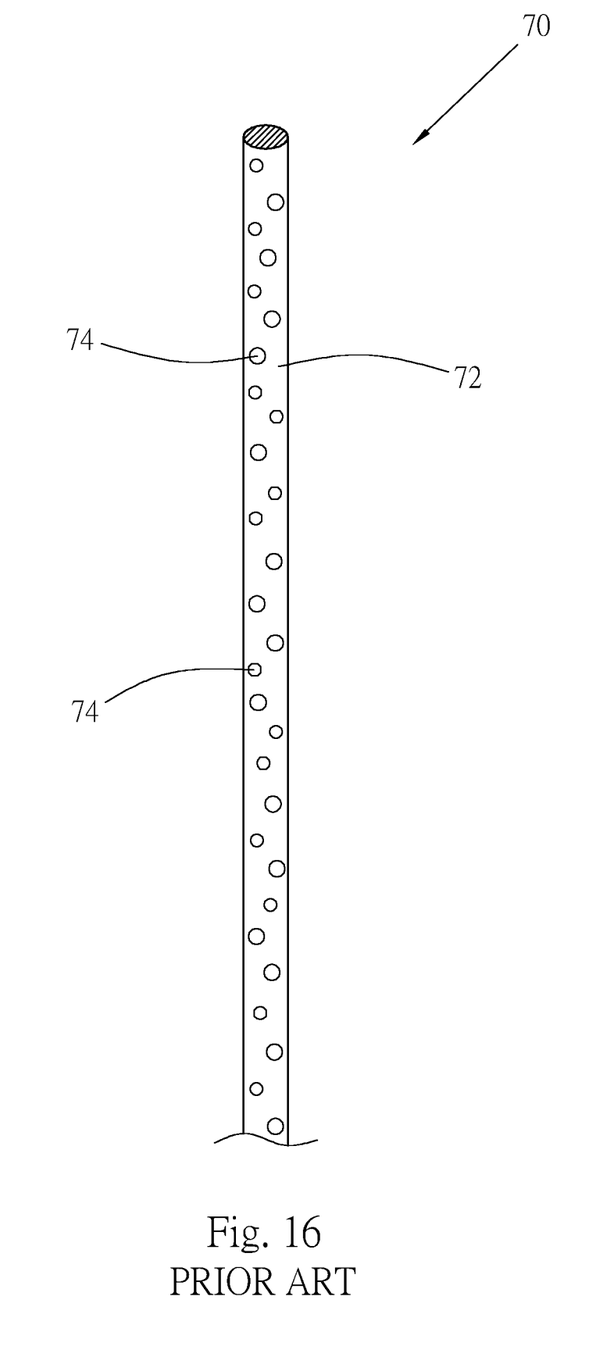
FIG. 16 is a schematic view of a conventional luminescent yarn.

FIG. 16 is a schematic view of a conventional luminescent yarn 70. The luminescent yarn 70 is made of a mixture of luminescent powders and polyester by means of drawnwork. The polyester forms the main body 72 of the luminescent yarn 70. The luminescent powders are formed of fine luminescent particles 74 distributed in the main body 72. A single-filament or a multi-filament luminescent yarn can be made by means of the manufacturing method of drawnwork. FIG. 16 shows a single-filament luminescent yarn. In the conventional luminescent yarn 70, the luminescent particles 74 are blended in the polyester so that the polyester will shade the luminescent particles 74 and the light absorption effect of the luminescent particles 74 is poor. This will affect the light-emitting effect. Moreover, the light absorption efficiency is poor so that the light-emitting time is shortened. Also, when the luminescent particles 74 emit light, the light is interrupted by the polyester so that the luminance of the light, (that is, the brightness of the luminescence) is poor. Therefore, the conventional luminescent yarn has the above shortcomings and needs to be improved.

Moreover, the main body 72 of the conventional luminescent yarn 70 is polyester and the luminescent particles 74 are minerals so that the two components can be hardly securely bonded with each other. The luminescent particles 74 are distributed in the main body 72, this results in deterioration of the strength of the main body so that the strength of the conventional luminescent yarn 70 is poor and the conventional luminescent yarn 70 cannot bear greater tension and is apt to be pulled and broken apart by the weaving machine.

In the manufacturing method of drawnwork, it is necessary to mix the polyester with the luminescent powders. The proportion of the luminescent particles 74 in the luminescent layer cannot be greatly changed. It can be known from FIG. 16 that in the case that the proportion of the luminescent particles 74 is increased, the polyester (main body 72) will be more interrupted by the luminescent particles 74. Therefore, the more the luminescent particles 74 are, the easier the luminescent yarn 70 is to break and become useless.

Furthermore, the luminescent particles of the luminescent powders are fine particles formed of the minerals by means of grinding. The luminescent particles 74 have irregular shapes. Therefore, in the conventional drawnwork manufacturing method, the yarn-drawing die head of the yarn-drawing machine will be worn by the luminescent particles so that the manufacturing cost for the luminescent yarn is higher.

In addition, the existing luminescent yarn can be made with different appearance colors, (which are not the color of the light emitted from the luminescent powders themselves). For example, the luminescent yarn can be made with pink color in such a manner that the luminescent powders are dyed and then the dyed luminescent powders are added to a mixture of polyesters and then the drawnwork is performed. Accordingly, in daytime, the luminescent yarn has an appearance color, which is the color of the dye. Therefore, different appearance colors of clothes can be made from the luminescent yarns.

Such dyeing manufacturing method can diversify the appearance color of the luminescent yarn, however, the dye will infiltrate into the luminescent particles to deteriorate the light absorption efficiency of the luminescent particles so that the light absorption efficiency of the luminescent powders will become poorer. In addition, the dye will interrupt the luminescence emitted from the luminescent particles at night. Therefore, the luminescence of the current colored luminescent yarn has poor brightness and short light-emitting time. Also, the luminescence will decay quickly so that the luminescent efficiency is poor.

SUMMARY OF THE INVENTION

It is therefore a primary object of the present invention to provide a luminescent yarn with an inventive structure and an inventive manufacturing method of the luminescent yarn. The luminescent yarn made by means of the manufacturing method of the present invention can emit luminescence with higher luminance. Moreover, the light-emitting time of the luminescent yarn is prolonged so that the lifetime of the luminescent yarn is longer.

It is a further object of the present invention to provide a luminescent yarn, which has higher strength.

It is still a further object of the present invention to provide a luminescent yarn, in which the proportion of the luminescent powders (luminescent particles) in the luminescent yarn can be easily changed without damaging the strength of the luminescent yarn.

It is still a further object of the present invention to provide a luminescent yarn and a manufacturing method of the luminescent yarn. The luminescent yarn has an appearance color, while still having high brightness (high luminance of luminescence) at night.

To achieve the above and other objects, the luminescent yarn of the present invention is an elongated fine strip made by means of cutting, the luminescent yarn has a multilayered structure, a cross-section of the luminescent yarn includes:

a main body; and at least one luminescent surface layer having luminescent particles capable of emitting luminescence, the at least one luminescent surface layer is positioned on at least one surface of the main body.

Accordingly, the luminescent surface layer is positioned on the surface of the main body, whereby the luminescent particles can directly absorb energy and emit luminescence so that the luminescent yarn has better luminance (brightness) and longer luminescent time. Moreover, the luminescent particles are not disposed inside the main body so that the strength of the main body will not be deteriorated. Accordingly, the luminescent yarn has better strength. Also, the luminescent particles are not disposed inside the main body so that the proportion of the added luminescent particles can be conveniently adjusted so as to change the luminance (brightness) of the luminescent yarn.

Preferably, the luminescent surface layer has multiple microcapsule luminescent granules. Each microcapsule luminescent granule has one or multiple luminescent particles and an enclosure layer for enclosing the one or multiple luminescent particles. The enclosure layer is transparent. The microcapsule luminescent granule totally isolates the luminescent particles from outer side so that the luminescent particles are not apt to be ruined and damaged to ensure the lifetime.

Preferably, the main body is made with a color (not the color of the original material of the main body). Alternatively, at least one colored layer is disposed on a surface of the main body to change the color of the main body and the luminescent yarn.

The manufacturing method of the luminescent yarn of the present invention includes steps of:

manufacturing a film material, the film material including a substrate material and at least one luminescent layer positioned on at least one surface of the substrate material, the at least one luminescent layer being able to emit luminescence; and cutting the film material to form the luminescent yarn.

Preferably, the luminescent layer has multiple microcapsule luminescent granules inside. Each microcapsule luminescent granule has one or multiple luminescent particles and an enclosure layer, for the enclosure layer encloses the one or multiple luminescent particles.

Preferably, a dye or a paint is mixed in the substrate material to change the color of the film material.

Preferably, at least one colored layer is disposed on at least one surface of the substrate material so as to change the color of the substrate material and the film material. Alternatively, a color is printed on the surface of the substrate material to change the color of the substrate material and the film material.

The present invention can be best understood through the following description and accompanying drawings, wherein:

DETAILED DESCRIPTION OF THE PREFERRED EMBODIMENTS

The present invention is related to a luminescent yarn structure and a manufacturing method thereof. The manufacturing method mainly serves to manufacture a film material with luminescent coating. The film material is then cut into filaments to make the luminescent yarn. The drawings of the specification are for easily illustrating the film material and luminescent yarn structure of the present invention and the actual sizes of the film material and the luminescent yarn are not as shown in the drawings.

Figure 1:
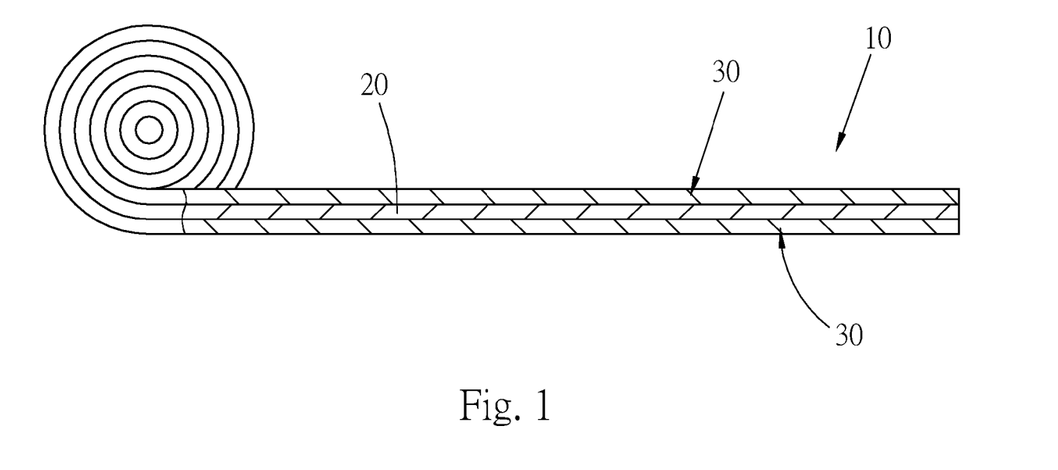
FIG. 1 is a sectional view of a first embodiment of the film material of the present invention.
Figure 4:
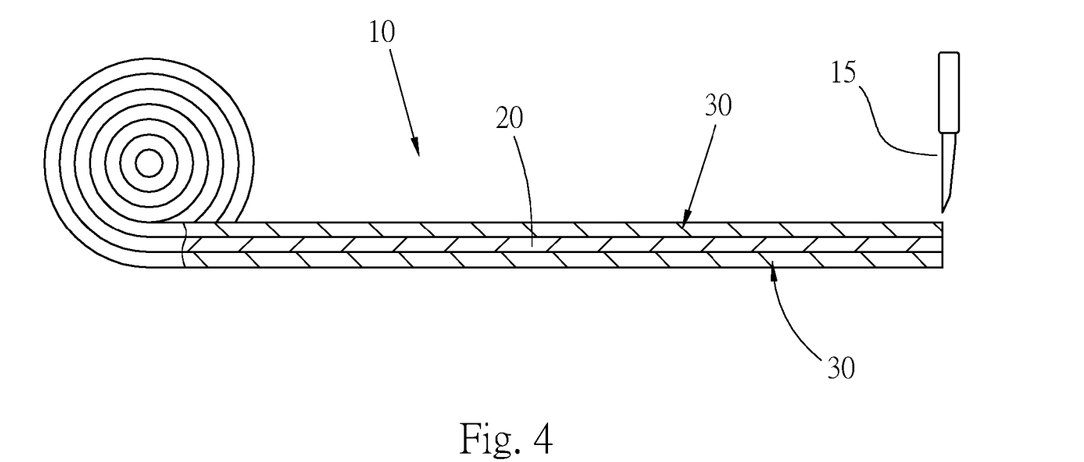
FIG. 4 is a sectional view showing that the film material of FIG. 1 is cut into luminescent yarn.
Figure 5:
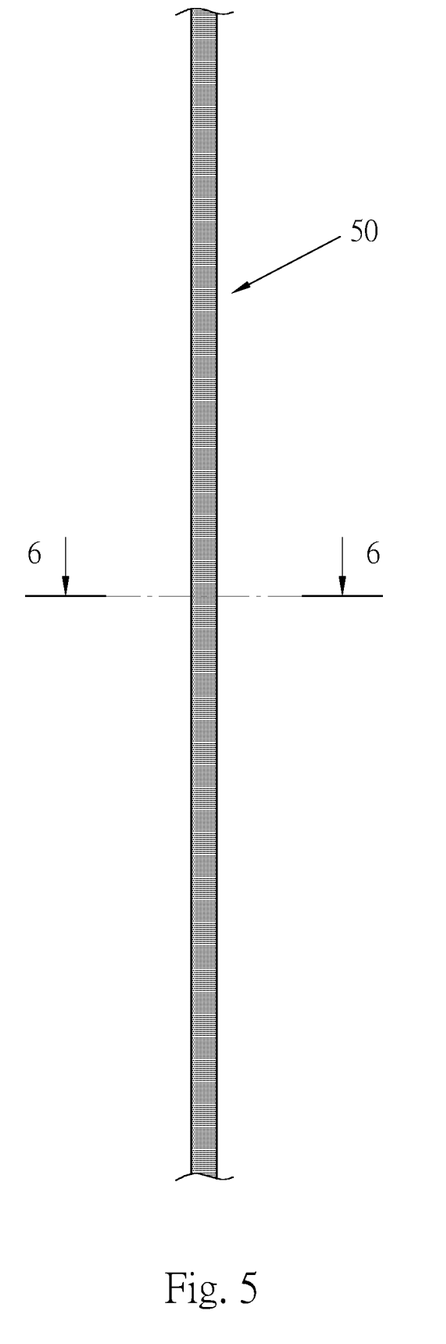
FIG. 5 is a schematic view of the luminescent yarn made by means of the first embodiment of the present invention.

Please refer to FIG. 1. The first manufacturing method of the luminescent yarn of the present invention is to first manufacture a film material 10 with luminescent function. In this embodiment, the film material is a film article having a considerable length and rolled into a roll. The film material 10 has a layered structure with two or over two layers. The film material 10 has an already made and shaped substrate material 20, a luminescent layer 30 is then attached to or coated on at least one surface of the substrate material 20. The luminescent layer 30 is able to emit light, (that is, luminescence) at night. Then, the film material 10 is cut into filaments as shown in FIG. 4. Blades 15 of a cutting apparatus are used to cut the film material 10 into fine filaments, the luminescent yarn 50 of the present invention as shown in FIG. 5 is manufactured.

In this embodiment, the substrate material 20 is a film, which is made of flexible polymer material or polymer such as, but not limited to, polyethylene terephthalate (PET), polyvinyl chloride (PVC), thermoplastic polyurethanes (TPU), thermoplastic elastomer (TPE), thermoplastic rubber (TPR), hot glue and silicone. In this embodiment, a luminescent layer 30 is coated on each of two surfaces (the first and second surfaces) of the substrate material 20. The luminescent layer 30 is able to emit luminescence in a place without light or with little light.

Figure 2:
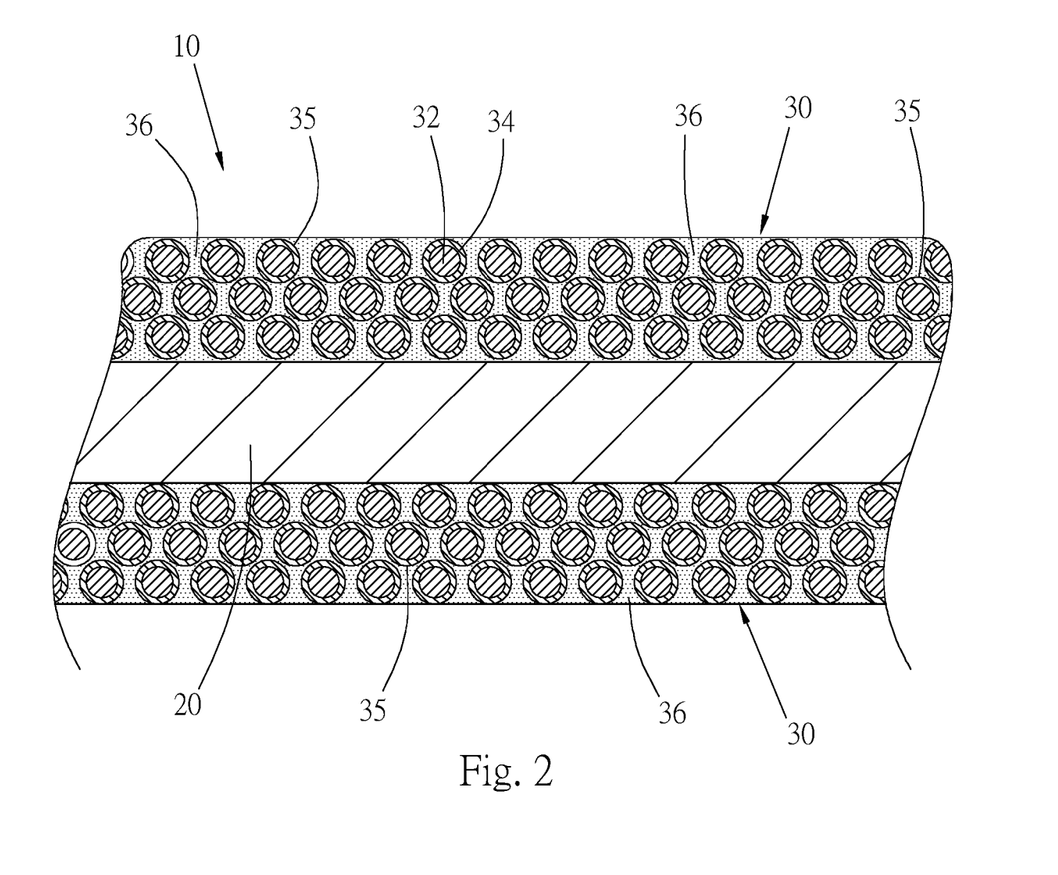
FIG. 2 is a high-power enlarged view of a part of FIG. 1.

Please refer to FIG. 2. In this embodiment, the luminescent layer 30 is a mixture of luminescent particles and polymer resin. The resin mixed with the luminescent particles can be any kind of resin. The luminescent particles 32 are micro-particles as powders. The luminescent particles 32 are a mineral product of rare earth element doped with alkaline earth aluminate or silicate. The size of the luminescent particles 32 ranges from 5 µm to 200 µm. The luminescent particles 32 themselves can emit light (luminescence). The color of the light emitted from the luminescent particles 32 can be made to be lemon yellow, light yellow, green, grass green, yellow green, blue green, sky blue, purple, etc. Please refer to FIGS. 2 and 3. The luminescent particle 32 of the present invention is enclosed by a transparent resin to form a microcapsule structure, (that is, a micro luminescent particle is enclosed in a micro enclosure layer). The transparent resin forms an enclosure layer enclosing the luminescent particle 32 and totally isolating the luminescent particle 32 from outer side so that the luminescent particle 32 will not contact the outer side to chemically react with water or other material. For example, the luminescent particles 32 are prevented from contacting water to become strong alkali (pH value up to 11) to injure the skin. Also, after a long period of contact with water, the luminescent particles 32 will lose the luminescent effect. The luminescent particle 32 is enclosed by the enclosure layer 34 to form a microcapsule luminescent granule 35. It should be noted that the luminescent particles 32 are so small that in manufacturing, multiple luminescent particles 32 may be enclosed in an enclosure layer 34. Therefore, each microcapsule luminescent granule 35 may contain one or multiple luminescent particles 32. The transparent resin forming the enclosure layer 34 of the present invention is selectively a resin capable of resisting against potassium chloride so as to prevent the luminescent particles 32 from contacting water to release strong alkali. The transparent resin is colorless so that the enclosure layer 34 is transparent and colorless.

A certain amount of microcapsule luminescent granules 35, (that is, the luminescent particles 32 enclosed in the enclosure layers 34) are mixed with a resin 36 to form a mixture such as a mixture liquid. The microcapsule luminescent granules 35 are uniformly distributed in the mixture liquid. The mixture liquid is attached to or coated on the two surfaces of the substrate material 20 to form the two luminescent layers 30. The microcapsule luminescent granules 35 are uniformly distributed in the luminescent layers. In this preferred embodiment, the resin 36 of the mixture liquid is selectively polyurethane (PU) resin and is transparent and colorless.

As necessary, the film material 10 can be made with different thicknesses such as ranging from 5 µm to 400 µm. After the film material 10 is made, as shown in FIG. 4, the blade 15 of the cutting apparatus is used to cut the film material into fine filaments to form the luminescent yarn 50 only with micro diameter as shown in FIG. 5. As necessary, the luminescent yarn 50 can be cut with various diameters. For example, the luminescent yarn 50 can be cut with a diameter of 1/100 inch, 1/69 inch, 1 mm or 2 mm.

Figure 3:
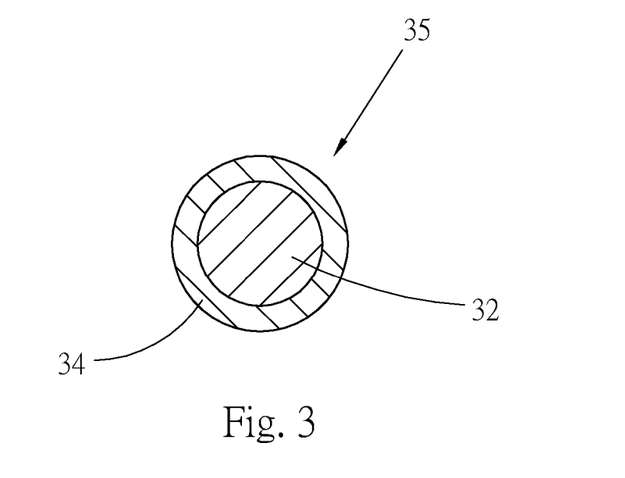
FIG. 3 is a sectional view of the microcapsule luminescent granule of the present invention.
Figure 6:
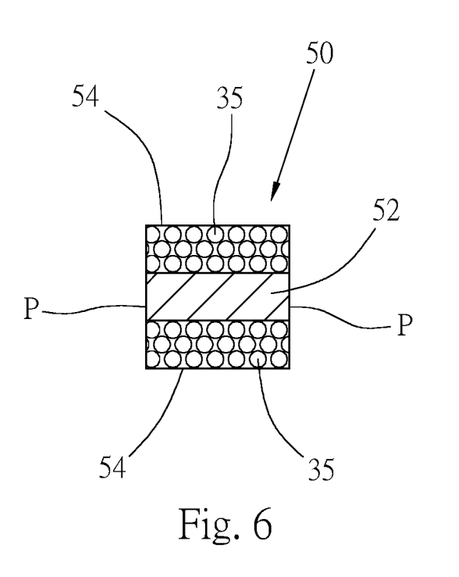
FIG. 6 is a sectional view taken along line 6-6 of FIG. 5.

Please refer to FIG. 6. The luminescent yarn 50 made by means of the above manufacturing method is a flexible (elongated) fine strip. The cross-section of the luminescent yarn 50 has the form of a rectangle, two lateral faces of the luminescent yarn 50 are plane faces P formed by means of cutting and the top and bottom faces of the yarn 50 are also plane faces formed of the top and bottom faces of the film material 10. The cross-section of the luminescent yarn 50 is a multilayered structure and includes a main body 52 and two luminescent surface layers 54 positioned on the two top and bottom surfaces of the main body 52. The main body 52 is formed of the aforesaid substrate material 20 and has a form of a rectangle in cross-section, while the luminescent surface layers 54 are formed of the aforesaid luminescent layers 30. Therefore, the luminescent surface layers 54 contain therein multiple microcapsule luminescent granules 35 as shown in FIG. 3. Each microcapsule luminescent granule 35 has an enclosure layer 34 and one or multiple luminescent particles 32 enclosed in the enclosure layer 34. The two luminescent surface layers 54 make the two surfaces of the luminescent yarn 50 emit luminescence.

A fabric can be directly woven from the luminescent yarns 50. The fabric can be used to manufacture clothes, shoes, bags and the like products. The products can emit luminescence. Therefore, when a user wears the products to act outdoors at night, the products can ensure safety for the user. The luminescent yarns 50 also can serve as the sewing thread or embroidery thread of a fabric, whereby the sewing edge of the fabric or the picture of the electrical embroidery has luminescent function.

Figure 7A:
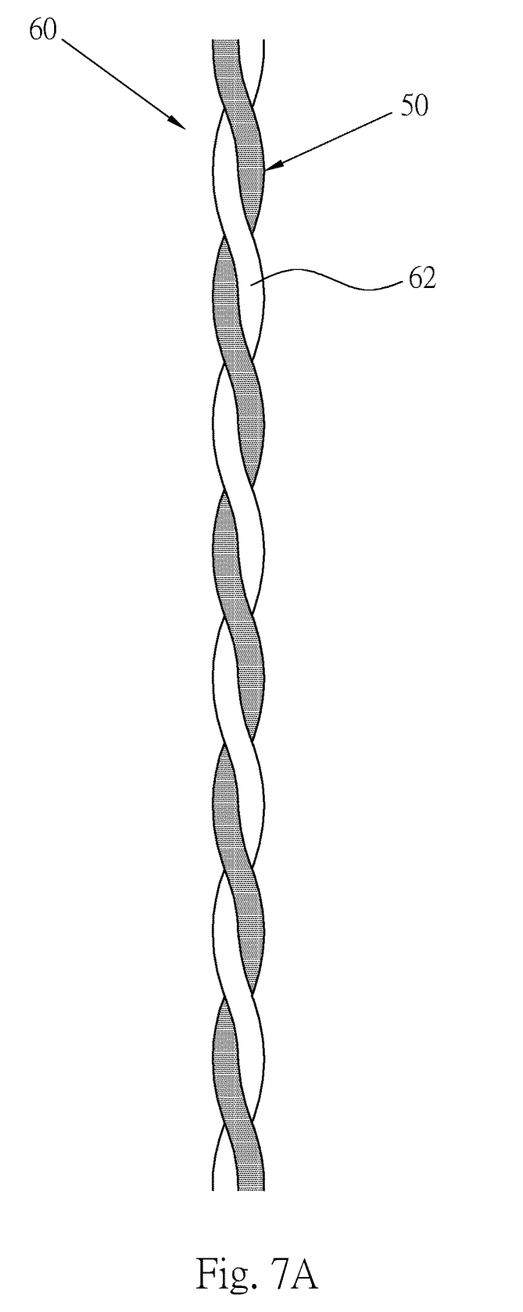
FIG. 7A is a schematic view showing that the luminescent yarn is twisted with a common yarn to form a thread.
Figure 7B:
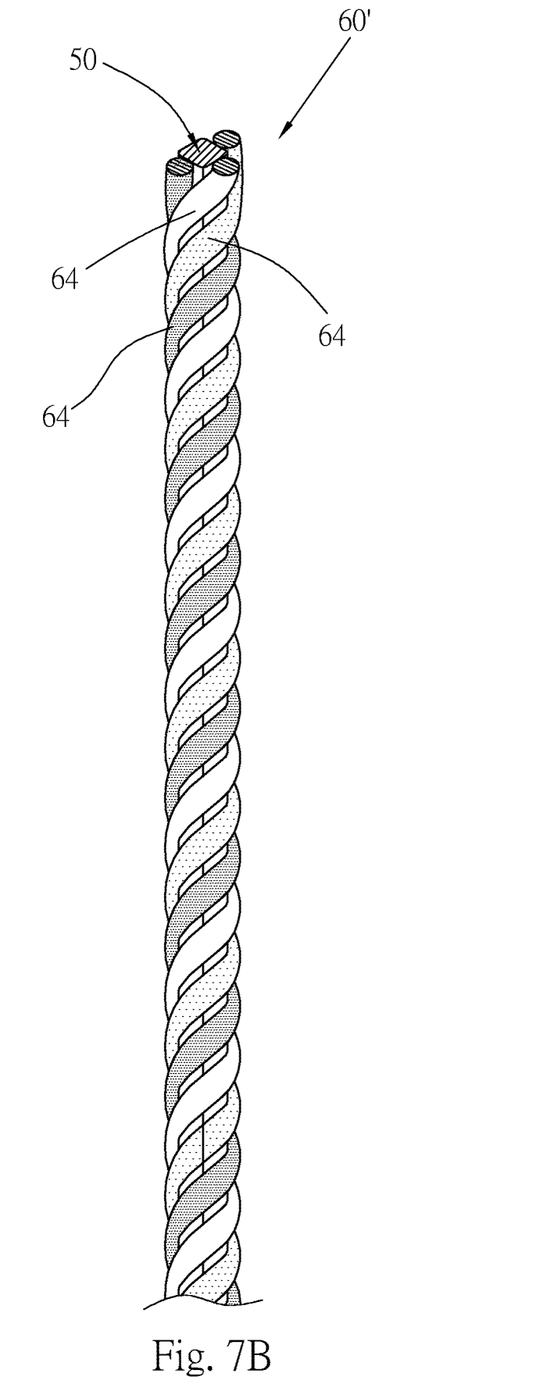
FIG. 7B is a schematic view showing that multiple yarns are provided to form a thread.

The luminescent yarns 50 of the present invention can be directly used. Alternatively, the luminescent yarns 50 can be twisted with a common yarn to form a multi-strand thread. For example, as shown in FIG. 7A, at least one luminescent yarn 50 of the present invention can be twisted with at least one common yarn 62 into a thread 60 for use in texture work. FIG. 7B shows that the luminescent yarn 50 of the present invention is provided with multiple yarns 64 to form a thread 60' for use in texture work. The multiple yarns 64 spirally enclose the luminescent yarn 50. The three yarns 64 can be made of the same material. For easy distinguishing, the yarns 64 are presented by different shadows in FIG. 7B. The three yarns 64 alternatively can be the luminescent yarns of the present invention. The thread 60 or 60' has higher strength than single luminescent yarn 50 and a fabric or a texture can be made from the thread 60 or 60', the thread 60 or 60' can be used as the sewing thread or embroidery thread. Accordingly, the fabric, texture, sewing thread or embroidery thread provides luminescent effect.

Figure 8:
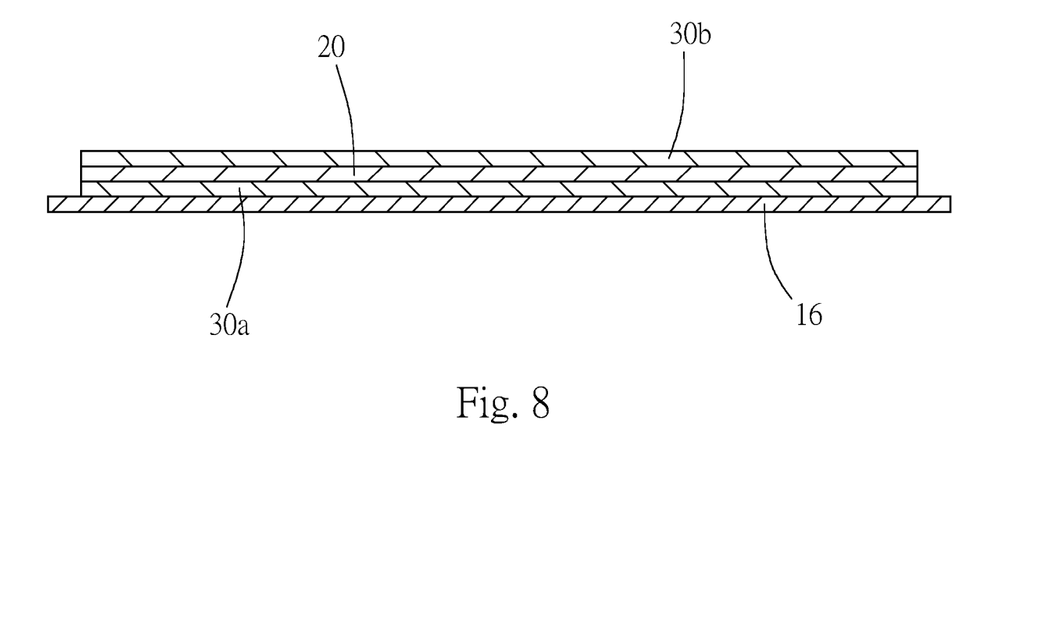
FIG. 8 shows another manufacturing method of the film material of the present invention.

FIG. 8 shows a second manufacturing method of the film material of the present invention. In the second manufacturing method, a carrier body 16 is first prepared. The carrier body 16 is a releasable film such as plastic-made releasable body or releasable paper. Then, a luminescent layer 30a (first layer), a substrate material 20 (second layer) and another luminescent layer 30b (third layer) are sequentially coated on the carrier body 16 from lower side to upper side. After the three layers are patterned, the carrier body 16 is removed to form the film material 10 as shown in FIG. 1, in which each of the two surfaces of the substrate material has a luminescent layer. The substrate material 20 is a polymer film (such as PU or hot melt glue). The two luminescent layers 30 (30a, 30b) are mixtures of luminescent particles and polymer resin (such as PU). Both the manufacturing methods of FIGS. 1 and 8 can be used to manufacture the respective embodiments of the film material as described in the specification.

Figure 9:
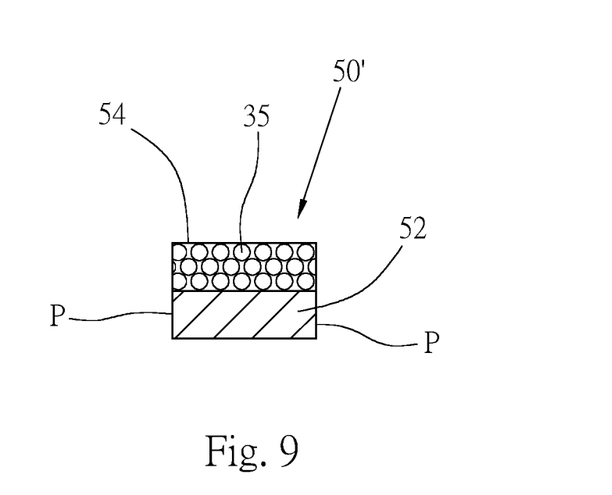
FIG. 9 is a sectional view showing another embodiment of the luminescent yarn of the present invention.

FIG. 9 is a sectional view showing a second embodiment of the luminescent yarn 50' of the present invention. The film material for cutting into the luminescent yarn 50' has a substrate material and a luminescent layer. Therefore, the luminescent yarn 50' is a two-layer structure with a cross-section in the form of a rectangle. The cross-section of the luminescent yarn 50' has a main body 52 and a luminescent surface layer 54 positioned on a surface of the main body 52. The main body 52 has transparence so that the luminescent surface layer 54 can emit luminescence through the other surface of the main body 52, whereby both surfaces of the luminescent yarn 50' can provide luminescent effect.

In the above content, the color of the luminescent yarn is not changed. According to the technical content of the present invention, the luminescent yarn can be made with different appearance colors so that the luminescent yarn can present various colors in daytime or a bright place. The appearance color is not the color of the luminescence emitted from the luminescent particles or the original color of the substrate material. Instead, the appearance color of the luminescent yarn is changed by means of dyeing or printing.

Figure 10:
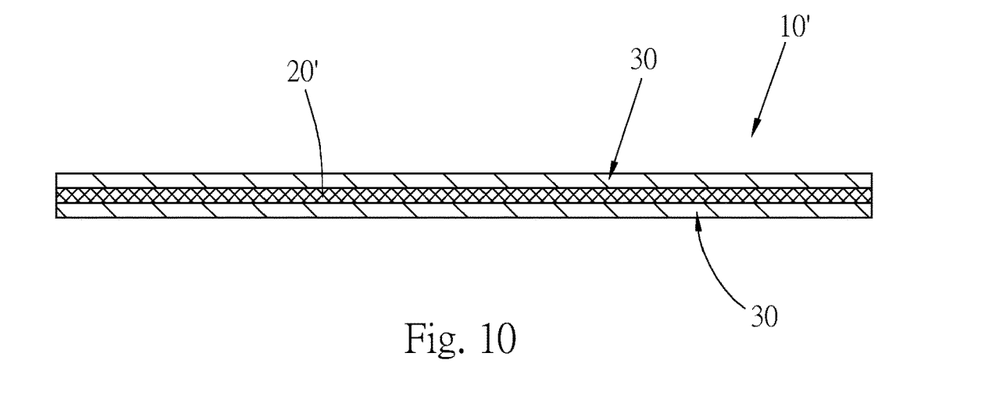
FIG. 10 is a sectional view of a third embodiment of the film material of the present invention.

FIG. 10 is a sectional view showing a third embodiment of the film material 10' of the present invention. The film material 10' also includes a substrate material 20' and two luminescent layers 30 coated on two surfaces of the substrate material, wherein a dye (color) or paint is added into the substrate material 20' so that the substrate material 20' has different colors. For example, the dye is filled into the substrate material or a calender is used to calender the dye and the substrate material to uniformly blend the dye with the substrate material, whereby the substrate material has the color of the dye. Accordingly, the color of the substrate material 20' is changed to further manufacture the luminescent yarn with different colors. The three layers of films of the film material 10' can be made by means of attachment. Alternatively, the three layers of films of the film material 10' can be coated on a carrier body by means of the second manufacturing method as shown in FIG. 8, (in which the first luminescent layer, the substrate material and the second luminescent layer are sequentially coated on the carrier body).

Figure 11:
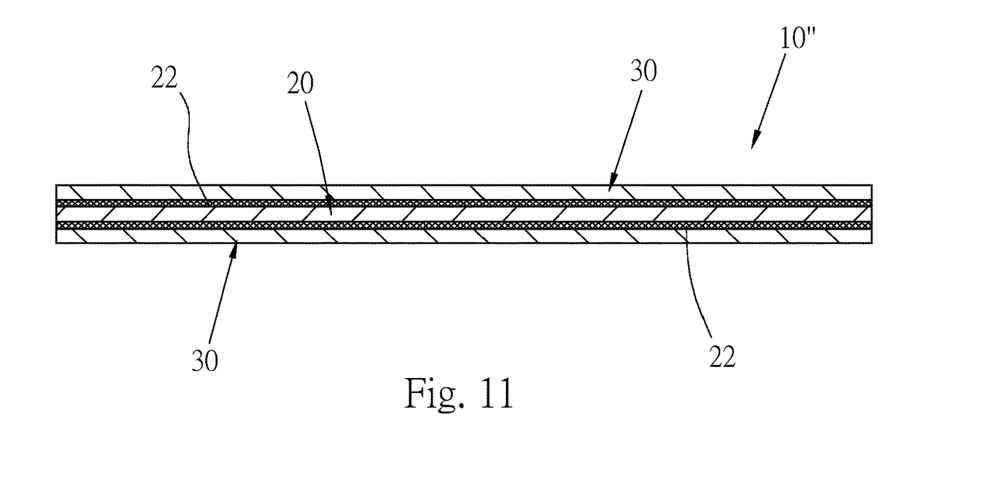
FIG. 11 is a sectional view of a fourth embodiment of the film material of the present invention.

FIG. 11 is a sectional view showing a fourth embodiment of the film material 10" of the present invention. The film material 10" includes a substrate material 20, two colored layers 22 and two luminescent layers 30. The two colored layers 22 are polymer material films respectively disposed on two surfaces of the substrate 20 by means of printing, coating (including coating on the carrier body) or attachment. The two luminescent layers 30 are respectively disposed on outer surfaces of the two colored layers 22 by means of coating (including coating on the carrier body) or attachment. When manufacturing the film material 10", the colored layers 22 with desired color can be selectively used, whereby the color of the two colored layers 22 becomes the color of the film material 10". That is, in this embodiment, by means of the colored layers 22, the color of the substrate material and the film material is changed. The two colored layers 22 can be made with various colors as necessary. Alternatively, the two colored layers 22 can have nontransparent white color so that the luminescent yarn becomes white.

Figure 12:
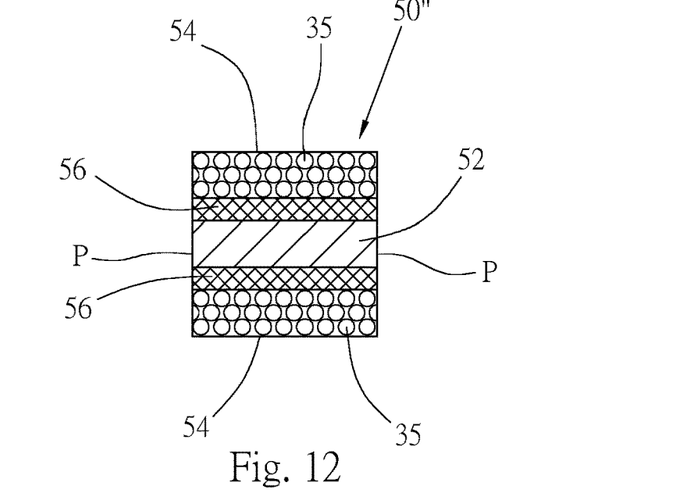
FIG. 12 is a sectional view of the luminescent yarn made from the film material of FIG. 10.

FIG. 12 is a sectional view showing the luminescent yarn 50" cut from the film material 10" of FIG. 11. The luminescent yarn 50" is a multilayered structure with a cross-section in the form of a rectangle. The cross-section of the luminescent yarn 50" has a main body 52, two colored layers 56 disposed on two surfaces of the main body 52 and two luminescent surface layers 54 positioned on outer surfaces of the two colored layers 56. The colored layers 56 are formed of the colored layers 22 of FIG. 11. The two colored layers 56 can change the color of the main body 52 so as to change the appearance color of the luminescent yarn 50".

Figure 13:
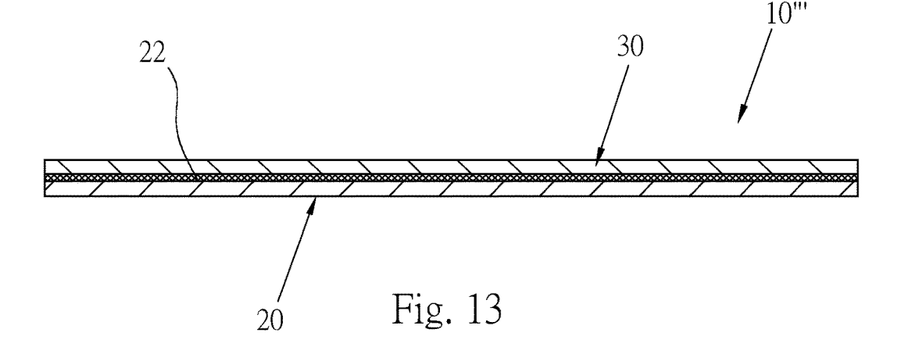
FIG. 13 is a sectional view of a fifth embodiment of the film material of the present invention.

FIG. 13 is a sectional view showing a fifth embodiment of the film material 10''' of the present invention. The film material 10''' includes a substrate material 20, a colored layer 22 disposed on a surface of the substrate material 20 and a luminescent layer 30 disposed on outer surface of the colored layer 22. The color of the colored layer 22 becomes the appearance color of the film material 10'''. The luminescent yarn made from the film material 10''' has a main body, a colored layer and a luminescent surface layer.

Figure 14:
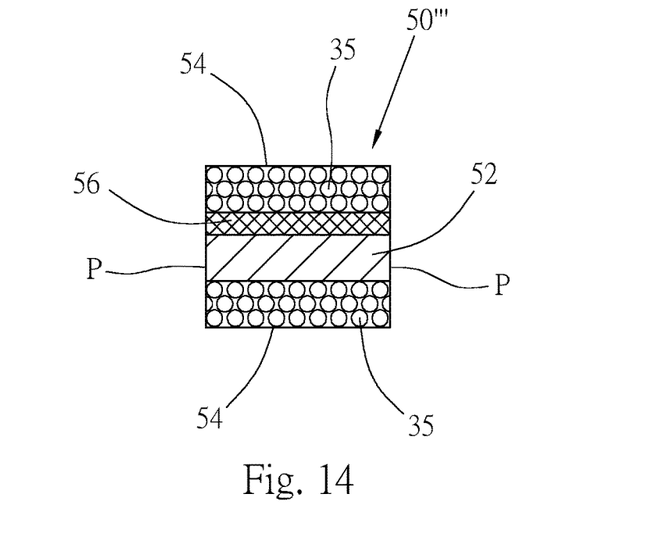
FIG. 14 is a sectional view of a sixth embodiment of the luminescent yarn of the present invention.

It should be noted that in practice, the film material can alternatively have a substrate material, a colored layer and two luminescent layers. The colored layer 22 is disposed on a surface (first surface) of the substrate material 20. The two luminescent layers 30 are respectively disposed on outer surface of the colored layer 22 and the other surface (second surface) of the substrate material 20. Accordingly, the colored layer can still change the appearance color of the film material and both the two surfaces of the film material have luminescent layers to emit luminescence. As shown in FIG. 14, the luminescent yarn 50''' made from the film material is a multilayered structure with a cross-section in the form of a rectangle. The cross-section of the luminescent yarn 50''' has a main body 52, a colored layer 56 disposed on the first surface of the main body 52 and two luminescent surface layers 54 respectively coated on or attached to the second surface of the main body and the outer surface of the colored layer 56.

Figure 15:
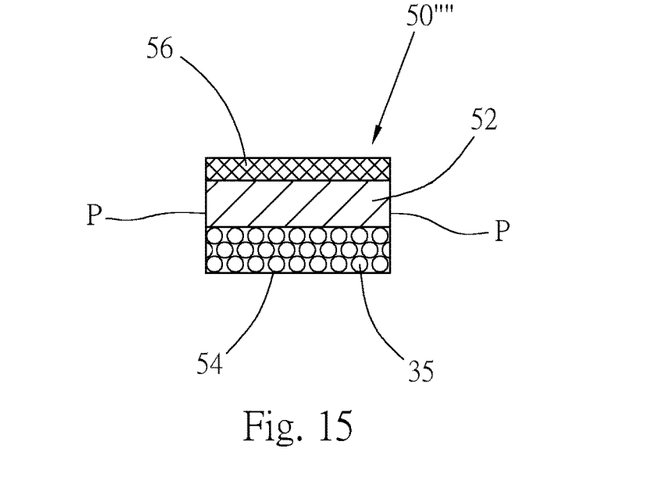
FIG. 15 is a sectional view of a seventh embodiment of the luminescent yarn of the present invention.

In practice, the film material can alternatively have a substrate material, a colored layer and a luminescent layer. The colored layer is disposed on a surface (first surface) of the substrate material. The luminescent layer is disposed on the other surface (second surface) of the substrate material. Accordingly, the colored layer can still change the appearance color of the film material. As shown in FIG. 15, the luminescent yarn 50'''' made from the film material has a main body 52, a colored layer 56 disposed on the first surface of the main body 52 and a luminescent surface layer 54 positioned on the second surface of the main body.

In the present invention, the film (the film material) is first manufactured and then the film is cut to form the luminescent yarn. Such manufacturing method is an originated manufacturing method of luminescent yarn product to improve the shortcomings existing in the conventional manufacturing method of the luminescent yarn. In addition, the luminescent yarn made by means of the manufacturing method is an inventive structure, which can enhance the luminescent effect of the luminescent yarn product.

The luminescent yarn 50 is made by means of cutting and has a cross-section in the form of a rectangle. (Two lateral faces of the luminescent yarn 50 are plane faces P formed by means of cutting and one or two luminescent surface layers 54 are positioned on the top face or/and bottom face of the main body 52). This is different from the conventional luminescent yarn, which is made by means of drawnwork. The conventional luminescent yarn made by means of drawnwork has a circular appearance.

The main body 52 is the main structure of the luminescent yarn 50 (50', 50") of the present invention as a basis for the strength of the luminescent yarn. The luminescent particles 32 are positioned on the surface of the main body 52 and are not disposed inside the main body so that the strength of the main body will not be affected or deteriorated. The luminescent yarn 50 of the present invention has better strength than the conventional luminescent yarn 70 and is able to bear greater tension without breaking.

The luminescent particles 32 of the present invention are not disposed inside the main body 52 so that the strength of the luminescent yarn will not be deteriorated. Therefore, the proportion of the luminescent particles in the luminescent layer can be freely changed. A high-proportion of luminescent particles can be added into the luminescent layer (to enhance the luminance of the luminescence) without weakening or deteriorating the strength of the luminescent yarn.

When sunlight or other light is projected onto the luminescent surface layer 54 of the luminescent yarn, the luminescent particles 32 can absorb the light and store energy. The luminescent particles 32 can emit luminescence at night or in a place without light or in a dark place.

The luminescent surface layer 54 of the luminescent yarn 50 of the present invention is positioned on the surface of the main body 50 without being blocked by the main body so that the luminescent surface layer 54 can directly absorb the energy of the light so that the energy storage efficiency is enhanced and the luminescent time is prolonged. Moreover, when the luminescent surface layer 54 emits luminescence, the luminescence is not shaded or interrupted so that the luminance of the luminescent yarn 50 is enhanced.

The luminescent particles 32 in the luminescent surface layer 54 of the present invention are enclosed in the transparent enclosure layers 34. The enclosure layers 34 have low opacity so that the light permeability and light penetration amount of the enclosure layers 34 are enhanced, whereby the luminescent particles 32 can more effectively absorb the light and store optical energy. Also, the enclosure layers 34 have higher permeability to the light emitted from the luminescent particles 32 so that the luminescent particles 32 can more effectively emit light and the light emitted from the luminescent particles 32 has higher brightness. Therefore, the microcapsule luminescent granules 35 have extremely high light permeability and light-emitting efficiency.

The brightness of the luminescent yarn of the present invention is higher than that of the conventional luminescent yarn. Also, the light-emitting time of the luminescent yarn of the present invention is longer than that of the conventional luminescent yarn. In addition, the luminescent particles 32 are enclosed in the enclosure layers 34 without reacting with outer side. Therefore, the lifetime of the luminescent surface layers 54 is longer than that of the conventional luminescent yarn.

Furthermore, the luminescent particles 32 are enclosed in the enclosure layers 34 without being released. Therefore, the luminescent particles 32 are prevented from combining with water to become strong alkali. Therefore, the pH value of the luminescent yarn of the present invention falls within the pH value range of 4.5-8.5 as required by the fabrics without exceeding the pH value required by the fabrics.

By means of changing the color of the substrate material, for example, mixing a dye or a paint with the substrate material or disposing at least one color layer on the surface of the substrate material, the luminescent yarn made by the present invention has an appearance color in daytime. In addition, according to the structural feature of the present invention, the color for changing the appearance color of the substrate material, the film material or the luminescent yarn will not infiltrate into the luminescent particles, therefore, the light-emitting and light absorption efficiency of the luminescent particles will not be affected so that the luminescence of the luminescent surface layer has high brightness. Moreover, with FIG. 12 taken as an example, the luminescent surface layer 54 is positioned on outer side of the colored layer 56 or the colored main body 52 so that the luminescent surface layer 54 will not be shaded by the colored layer or the colored main body or blocked by the dye (the color). Also, no color will infiltrate into the luminescent particle 32 so that the luminescence-emitting efficiency of the luminescent surface layer 54 will not be affected. Therefore, the luminescent surface layer 54 of the luminescent yarn can more directly and efficiently absorb the optical energy and the luminescence emitted from the luminescent surface layer 54 will not be shaded or blocked by any thing. Accordingly, the luminescent yarn with the appearance color of the present invention can still have high brightness (or high luminance of luminescence) at night and have high light absorptivity (absorbing energy of light).

The above embodiments are only used to illustrate the present invention, not intended to limit the scope thereof. Many modifications of the above embodiments can be made without departing from the spirit of the present invention.

What is claimed is:

1. A luminescent yarn, which is a strip made by means of cutting, the luminescent yarn having a cross-section in the form of a rectangle, the cross-section of the luminescent yarn being a multilayered structure and including;
   a main body;
   at least one colored layer being a predetermined color, the colored layer being located on at least one surface of the main body; and
   at least one luminescent surface layer being dye free and having multiple luminescent particles capable of absorbing energy and emitting luminescence and a resin, the resin is transparent, the at least one luminescent surface layer being positioned on an outer side of the colored layer, the at least one colored layer being located between the main body and the at least one luminescent surface layer;
   wherein the predetermined color of the at least one colored layer is the appearance color of the luminescent yarn.

2. The luminescent yarn as claimed in claim 1, wherein each said luminescent surface layer has multiple microcapsule luminescent granules, each microcapsule luminescent granule having one or multiple luminescent particles of the multiple luminescent particles and an enclosure layer, the enclosure layer enclosing the one or multiple luminescent particles, the enclosure layer being transparent.

3. The luminescent yarn as claimed in claim 2, wherein the enclosure layer is made of a resin.

4. The luminescent yarn as claimed in claim 2, wherein the luminescent surface layer is a mixture of the microcapsule luminescent granules and the resin, the resin of the mixture being transparent and colorless.

5. The luminescent yarn as claimed in claim 1, wherein the main body is made of flexible polymer material or polymer, a dye or a paint being blended in the main body.

6. The luminescent yarn as claimed in claim 1, wherein two lateral faces of the luminescent yarn are plane faces formed by means of cutting, the at least one luminescent surface layer being positioned on at least one of the top face and the bottom face of the main body.

7. A manufacturing method of luminescent yarn, comprising steps of:
   manufacturing a film material, the film material having a substrate material, at least one colored layer positioned on at least one surface of the substrate material, and at least one luminescent layer positioned on an outer side of the at least one colored layer, the at least one colored layer being a predetermined color, the at least one luminescent layer being dye free and having multiple luminescent particles and a resin, the multiple luminescent particles being capable of absorbing energy and emitting luminescence, the resin being transparent, the at least one colored layer being located between the substrate material and the at least one luminescent surface layer, the substrate material being a flexible film, the predetermined color of the at least one colored layer is the appearance color of the luminescent yarn;
   cutting the film material to form the luminescent yarn, the cross-section of the luminescent yarn has the form of a rectangle.

8. The manufacturing method of luminescent yarn as claimed in claim 7, wherein each said luminescent layer has multiple microcapsule luminescent granules inside, each microcapsule luminescent granule having one or multiple luminescent particles of the multiple luminescent particles and an enclosure layer, the enclosure layer enclosing the one or multiple luminescent particles, the enclosure layer being transparent.

9. The manufacturing method of luminescent yarn as claimed in claim 8, wherein the enclosure layer is made of a resin.

10. The manufacturing method of luminescent yarn as claimed in claim 8, wherein the luminescent layer is a mixture of the microcapsule luminescent granules and the resin, the resin of the mixture being transparent and colorless.

11. The manufacturing method of luminescent yarn as claimed in claim 7, wherein the substrate material is made of flexible polymer material or polymer, a dye or a paint being blended in the substrate material.

12. The manufacturing method of luminescent yarn as claimed in claim 7, wherein the substrate material and the luminescent layer are formed by means of attachment or coating.

13. The manufacturing method of luminescent yarn as claimed in claim 7, wherein the colored layer is disposed on the surface of the substrate material by means of printing, coating or attachment.

\* \* \* \* \*